(12) United States Patent
Lu et al.

(10) Patent No.: US 9,296,391 B2
(45) Date of Patent: Mar. 29, 2016

(54) E-DRIVE TORQUE SENSING VEHICLE STATE ESTIMATION METHODS FOR VEHICLE CONTROL

(71) Applicant: FORD GLOBAL TECHNOLOGIES, LLC, Dearborn, MI (US)

(72) Inventors: Jianbo Lu, Northville, MI (US); Hai Yu, Canton, MI (US); Wei Liang, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 14/224,976

(22) Filed: Mar. 25, 2014

(65) Prior Publication Data

US 2015/0274159 A1    Oct. 1, 2015

(51) Int. Cl.
| | |
|---|---|
| *B60W 30/02* | (2012.01) |
| *B60T 8/171* | (2006.01) |
| *B60W 40/12* | (2012.01) |
| *G01L 5/13* | (2006.01) |
| *B60T 8/175* | (2006.01) |

(52) U.S. Cl.
CPC .............. *B60W 30/02* (2013.01); *B60T 8/171* (2013.01); *B60T 8/175* (2013.01); *B60W 40/12* (2013.01); *G01L 5/13* (2013.01); *B60T 2260/04* (2013.01); *Y10S 903/93* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,909,959 B2* | 6/2005 | Hallowell | ........................ | 701/88 |
| 7,243,011 B2* | 7/2007 | Koenig et al. | .................... | 701/22 |
| 7,543,670 B2* | 6/2009 | Tamai et al. | .................. | 180/197 |
| 7,607,499 B2* | 10/2009 | Egami | ...................... | 180/65.265 |
| 8,342,618 B2* | 1/2013 | Yanagida et al. | ............. | 303/151 |
| 8,587,424 B2* | 11/2013 | Aberizk | ........................ | 340/467 |
| 2001/0035061 A1* | 11/2001 | Fischer et al. | .............. | 74/336 R |
| 2002/0000262 A1* | 1/2002 | Ono et al. | ...................... | 148/121 |
| 2002/0013195 A1* | 1/2002 | Ochi et al. | ...................... | 477/143 |
| 2003/0162631 A1* | 8/2003 | Williams | .......................... | 477/5 |
| 2003/0183431 A1* | 10/2003 | Cikanek et al. | ............. | 180/65.6 |
| 2003/0184154 A1* | 10/2003 | Joyce | ............................ | 303/152 |
| 2003/0184155 A1* | 10/2003 | Crombez et al. | ............. | 303/152 |
| 2003/0230443 A1* | 12/2003 | Cramer et al. | ............... | 180/65.5 |
| 2004/0012250 A1* | 1/2004 | Kuno et al. | ...................... | 303/20 |
| 2004/0128050 A1* | 7/2004 | Rieger et al. | .................... | 701/67 |
| 2004/0134267 A1* | 7/2004 | Boesch et al. | ............... | 73/118.1 |
| 2004/0176899 A1* | 9/2004 | Hallowell | ........................ | 701/84 |
| 2004/0207348 A1* | 10/2004 | Wilton et al. | ................. | 318/139 |
| 2004/0210356 A1* | 10/2004 | Wilton et al. | .................. | 701/22 |
| 2005/0182532 A1* | 8/2005 | Tobler et al. | .................... | 701/22 |
| 2005/0182533 A1* | 8/2005 | Tobler et al. | .................... | 701/22 |
| 2005/0218717 A1* | 10/2005 | Nishina et al. | ................ | 303/152 |
| 2006/0021811 A1* | 2/2006 | Kuang et al. | ................. | 180/65.3 |
| 2007/0095589 A1* | 5/2007 | Tamai et al. | .................. | 180/197 |
| 2007/0102206 A1* | 5/2007 | Lee | ............................ | 180/65.2 |
| 2007/0138986 A1* | 6/2007 | Kutsuna et al. | ............... | 318/254 |
| 2007/0199745 A1* | 8/2007 | Hayashi | ....................... | 180/65.2 |
| 2007/0272456 A1* | 11/2007 | Shiiba | .......................... | 180/65.2 |
| 2007/0275819 A1* | 11/2007 | Hirata | .............................. | 477/5 |
| 2007/0299593 A1* | 12/2007 | Karnjate et al. | ............... | 701/70 |
| 2008/0017427 A1* | 1/2008 | Nakanowatari | ............. | 180/65.2 |
| 2009/0115246 A1* | 5/2009 | Yanagida et al. | ............. | 303/144 |

(Continued)

*Primary Examiner* — Bhavesh V Amin
(74) *Attorney, Agent, or Firm* — David Kelley, Esq.; Tung & Associates (57) ABSTRACT

Vehicle state estimation methods include measuring torque, using the measured torque to formulate a vehicle state estimation for vehicle control and applying the vehicle state estimation to control the vehicle.

35 Claims, 6 Drawing Sheets

(56) References Cited

U.S. PATENT DOCUMENTS

| | | | |
|---|---|---|---|
| 2009/0118881 A1* | 5/2009 | West et al. | 701/22 |
| 2009/0234551 A1* | 9/2009 | Aswani et al. | 701/82 |
| 2010/0250056 A1* | 9/2010 | Perkins | 701/35 |
| 2011/0112708 A1* | 5/2011 | Fassnacht | 701/22 |
| 2011/0174557 A1* | 7/2011 | Tanba et al. | 180/65.22 |
| 2012/0022730 A1* | 1/2012 | Maass et al. | 701/22 |
| 2012/0053790 A1* | 3/2012 | Oikawa | 701/37 |
| 2012/0059544 A1* | 3/2012 | Kinoshita et al. | 701/22 |
| 2012/0150376 A1* | 6/2012 | Ash et al. | 701/22 |
| 2012/0202646 A1* | 8/2012 | Suzuki et al. | 477/5 |
| 2012/0299367 A1* | 11/2012 | Ross et al. | 303/3 |
| 2013/0211678 A1* | 8/2013 | Lee et al. | 701/42 |
| 2013/0261865 A1* | 10/2013 | Toki | 701/22 |
| 2013/0289809 A1* | 10/2013 | Treharne et al. | 701/22 |
| 2013/0289810 A1* | 10/2013 | Holmes et al. | 701/22 |
| 2013/0297107 A1* | 11/2013 | Dai et al. | 701/22 |
| 2014/0038772 A1* | 2/2014 | Dai et al. | 477/3 |

\* cited by examiner

E-DRIVE TORQUE SENSING VEHICLE STATE ESTIMATION METHODS FOR VEHICLE CONTROL

FIELD

Illustrative embodiments of the disclosure generally relate to vehicle control methods. More particularly, illustrative embodiments of the disclosure relate to electronic drive torque sensing vehicle state estimation methods for control of vehicles.

BACKGROUND

In the design of motor vehicles, much effort may be expended to improve vehicle handling and dynamic stability on road surfaces. For example, wheel slip, which occurs when the outer edge of a tire on a wheel of a vehicle moves at a higher velocity than the vehicle, may be controlled using various traction control methods. Electronic drive torque sensing vehicle state estimation methods for control of vehicle wheel slip and other vehicle handling, stability and other parameters may be useful.

SUMMARY

Illustrative embodiments of the disclosure are generally directed to vehicle state estimation methods for control of vehicle handling, stability and other parameters. The methods may include measuring torque, using the measured torque to formulate a vehicle state estimation for vehicle control and applying the vehicle state estimation to control the vehicle.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Illustrative embodiments of the disclosure relate to torque sensing vehicle state estimation methods for controlling wheel slip and other parameters of vehicle operation. Torque sensing may lead to state estimations for such parameters of vehicle operation as longitudinal accelerometer offset compensation, vehicle loading estimation, brake effort estimation, brake balancing, regenerative braking redistribution, brake lining friction estimation, acceleration reconstruction and enhanced wheel slip control, for example and without limitation. Torque sensing may additionally be used to implement smooth torque transition among different types of actuations (compression braking, regenerative braking, friction braking, E-traction, IC-traction, etc.). Moreover, brake effort balance and redistribution between regenerative braking and friction braking may be possible. The torque sensing vehicle state estimation methods may be applicable to HEV, PHEV or BEV vehicles, for example and without limitation.

Torque sensing based vehicle state estimation methods and control capabilities according to the disclosure may include longitudinal accelerometer offset compensation, vehicle loading estimation, brake effort estimation (by-wire brake used in HEV with regenerative braking), brake balancing (balancing between regenerative & friction braking if both are applied), regenerative brake redistribution (rear wheel drive regenerative braking redistribution during potential unstable vehicle motion events), lining friction coefficient estimation, acceleration compensation and reconstruction, enhanced wheel slip estimation, for example and without limitation.

An exemplary E-drive control has a unique chain of control actions. It generates actuation torques (AT) at the actuator locations, e.g., the axle motor torque at the axle motor location. AT is then transferred to torque applied to the wheels and such torques are called active wheel torques(AWTs). AWTs then generate the reaction torque and forces applied from the road called road torques/forces (RT/F). RT/F are the final torque and forces that directly contribute to the movement of the vehicle.

Therefore if the ATs at the actuator locations can be measured, then the AWTs can be estimated from ATs, and RT/F can be further estimated from AWTs. Since the accuracy of AT measurements generated from motors are greater than those estimated in internal combustion engines, the vehicle controls utilizing motor actuation torque based vehicle state estimation are likely enhanced. More specifically, e-drive control enhancement in implementation may include:

Enhanced wheel slip control due to the enhanced road torque and force estimation. For example, the anti-lock brake (ABS) might only need 2 phases instead of 4 phases used in the traditional ABS systems.

Enhanced RT/F estimation leading to improve pedal feel for the by-wire pedal system.

Enhanced RT/F estimation leading to improved regenerative brake stability management, especially, for rear wheel drive hybrid vehicle where regenerative braking is applied at the rear axle and when vehicle is braked on snow and icy roads.

AWT based control strategy leads to smoothly blending between powertrain and friction braking torques (e.g., lining friction can be estimated so as to adapt friction torque level to the powertrain/regenerative braking torque level);

For future electric vehicle (with eCorner or eHub or in-wheel-motor), the wheel slip control is different from the traditional one. The coordination among individual wheels is likely conducted through wheel torques. Hence precise estimation of RT/F is needed.

Figure 1:
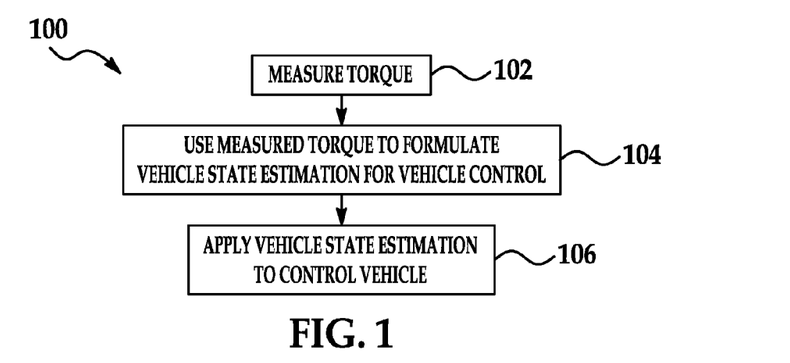
FIG. 1 is a flow diagram of an illustrative embodiment of the vehicle state estimation methods.

Referring to FIG. 1, a flow diagram 100 of an illustrative embodiment of the vehicle state estimation methods is shown. In block 102, AWTs can be estimated from the AT measurements. There are two types of AWTs: linear and nonlinear AWTs. The linear AWTs are those that lead to proportional longitudinal tire force to move and stop a vehicle, such as those where traction and braking forces do not generate large slips at the wheels. The nonlinear AWTs are those that lead to longitudinal and lateral tire forces limited by friction circle such as in the events of activating traction control system (TCS), ABS, and stability control systems.

In block 104, the torque which was measured in block 102 may be used to formulate a vehicle state estimation for vehicle control. The vehicle state estimation may include the estimations of the following quantities:

the active wheel torque (linear or nonlinear portion based if it can induce no-saturated or saturated tire forces at the corresponding wheel);
the tire torque and force;
the longitudinal accelerometer offset compensation;
the vehicle loading;
the braking effort;
the brake balancing;
regenerative brake redistribution;
lining friction;
acceleration reconstruction.

In block 106, the vehicle state estimation which was formulated in block 104 may be applied to control a vehicle. The vehicle state estimation may be applied to control brake effort which is required to depress the vehicle brake pedal, regenerative brake redistribution (arranging the percentage of regenerative braking utilized in the total braking), vehicle acceleration, wheel slip control, and smooth blending between powertrain and friction braking torques, for example and without limitation.

Figure 2:
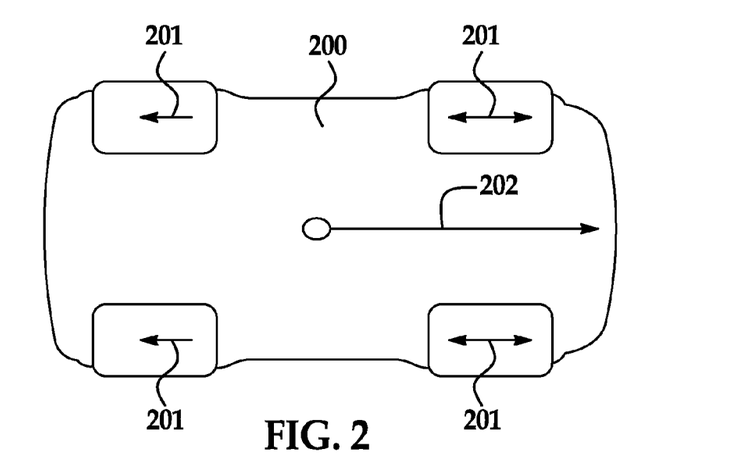
FIG. 2 is a diagrammatic view of a vehicle, more particularly illustrating an exemplary linear AWT (Active Wheel Torque) measurement technique for vehicle state estimation methods.

Referring to FIG. 2, a diagrammatic view of a vehicle 200 illustrating an exemplary linear AWT (Active Wheel Torque) estimation is shown. Linear AWT 201 which leads to a proportional longitudinal tire force 202 to move and stop the vehicle 200 is estimated based from the measured actuation torque(AT). The linear AWT 201 may be used to control braking and regenerative braking before the wheel reaches its braking force saturation points, for example and without limitation, in the vehicle 200.

Figure 3:
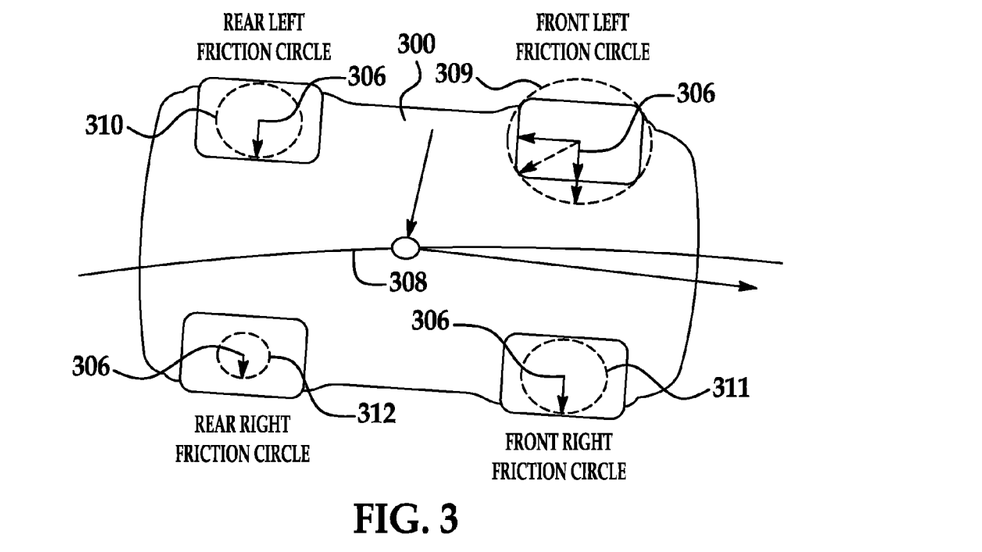
FIG. 3 is a diagrammatic view of a vehicle, more particularly illustrating an exemplary nonlinear AWT measurement technique for vehicle state estimation methods.

Referring next to FIG. 3, a diagrammatic view of a vehicle 300 illustrating an exemplary nonlinear AWT estimation technique is shown. Nonlinear AWT 306 estimates the active wheel torque effort that induce longitudinal and lateral tire forces 308 limited or saturated by friction circles 309, 310, 311 and 312 to move and stop the vehicle 300. The nonlinear AWT 306 may be used for enhance traction control system (TCS), anti-lock brake system (ABS), electronic stability control (ESC), roll stability control (RSC), curve control (CC), torque vectoring (TV), and regenerative stability management (RSM), for example and without limitation, in the vehicle 300.

Figure 4:
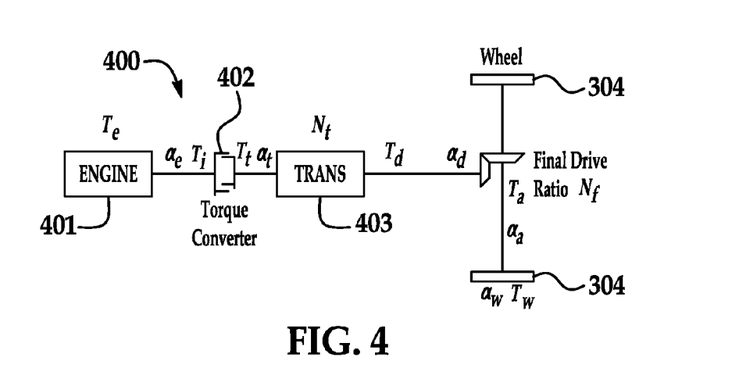
FIG. 4 is a diagrammatic view of a vehicle drivetrain, more particularly illustrating an exemplary motor torque measurement technique for vehicle state estimation methods.

Referring next to FIG. 4, a diagrammatic view of a vehicle drivetrain 400 illustrating an exemplary motor torque measurement technique for vehicle state estimation methods is shown. The vehicle drivetrain 400 may include an engine 401, a transmission 403 interfacing with the engine 401 and a torque converter 402 between the engine 401 and the transmission 403. Drive wheels 404 interface with the transmission 403.

The driving torque generated from the engine or the motor estimated at the wheel locations can be estimated based on the engine speed, the transmission gear ratios, the inertias of the involved subsystems. Consider the pure IC engine case, if the compliances in all the axles are neglected, then the driving torque at the wheel location (in conjunction with FIG. 4) can be estimated as in the following:

$$T_d = \frac{1}{2}[(T_e - I_e a_e)f(\sigma)N_t N_f - (I_t N_t^2 N_f^2 + I_d N_f^2 + I_a)a_a]$$

where $T_e$ is the engine torque, $I_e$ is the engine inertia, $I_t$ is the transmission inertia, $I_d$ is the outshaft inertia, $I_a$ is the inertia of the axle, $N_t$ is the transmission gear ratio, $N_f$ is the final drive ratio, $a_e$ is the engine rotational acceleration (derivative of the engine speed), $a_a$ is the derivative of the rotational speed of the axle, $f(\sigma)$ is the gain for the torque converter, $\sigma$ is the ratio of the out-shaft speed to input-shaft of the torque converter.

Figure 5:
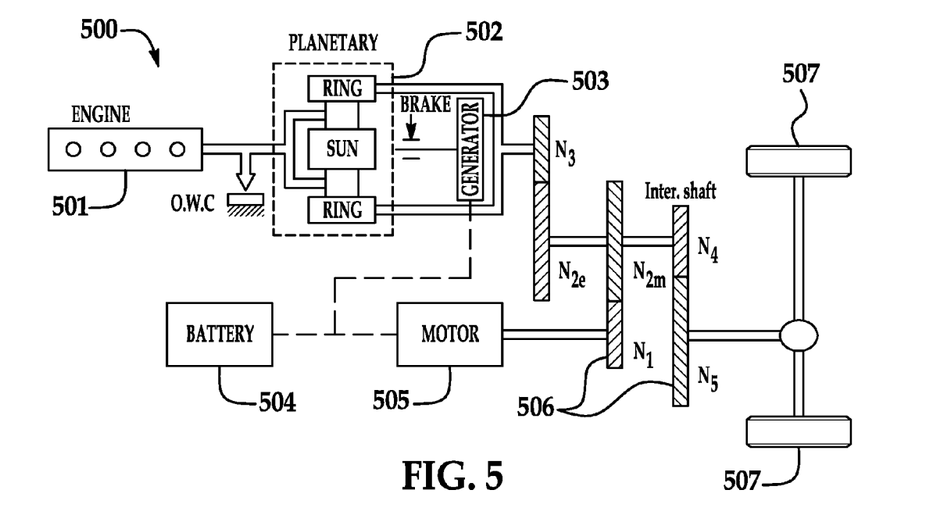
FIG. 5 is a diagrammatic view of a vehicle drivetrain, more particularly illustrating combining motor torque measurement with internal combustion (IC) engine torque estimation in a hybrid mode of a vehicle for vehicle state estimation methods.

Referring next to FIG. 5, a diagrammatic view of a power-split hybrid drivetrain 500 which includes a planetary gear together various other gears combining motor actuation with actuation from an internal combustion (IC) engine. The active driving torque for such a hybrid powertrain transferred to the wheel locations can be computed. In the following, the active driving torque at the wheel locations is used to as an illustrative example. The vehicle drivetrain 500 may include an engine 501, a regenerative brake system 502 interfacing with the engine 501, a generator 503 interfacing with the regenerative brake system 502, a battery 504 and an electric motor 505 connected to the generator 503, a transmission 506 interfacing with the regenerative brake system 502 and drive wheels 507 interfacing with the transmission 506. Motor torque is accurate in EV mode. For this powertrain configuration, the $$T_d = \frac{1}{2}\left[(T_m - I_m a_m)\frac{N_{2m}N_5}{N_1 N_4} - (T_e - I_e a_e)\frac{1+\rho}{\rho^2}\frac{N_{2e}N_5}{N_3 N_4} - (I_d N_f^2 + I_a)a_a\right]$$

Where $N_1$, $N_{2m}$, $N_{2e}$, $N_3$, $N_4$, $N_5$ are the gear ratios shown in FIG. 5, $T_m$ is the motor torque, $I_m$ is the inertia of the motor, $a_m$ is the motor rotational acceleration which can be calculated from the measured motor rotational speed, $\rho$ is the planetary gear ratio.

Referring next to FIG. 5, a diagrammatic view of a vehicle drivetrain 500 in combining motor torque measurement with internal combustion (IC) engine torque estimation in a hybrid mode of a vehicle according to an illustrative vehicle state estimation method is shown. The vehicle drivetrain 500 may include an engine 501, a regenerative brake system 502 interfacing with the engine 501, a generator 503 interfacing with the regenerative brake system 502, a battery 504 and an electric motor 505 connected to the generator 503, a transmission 506 interfacing with the regenerative brake system 502 and drive wheels 507 interfacing with the transmission 506. Motor torque is accurate in EV mode.

Figure 6:
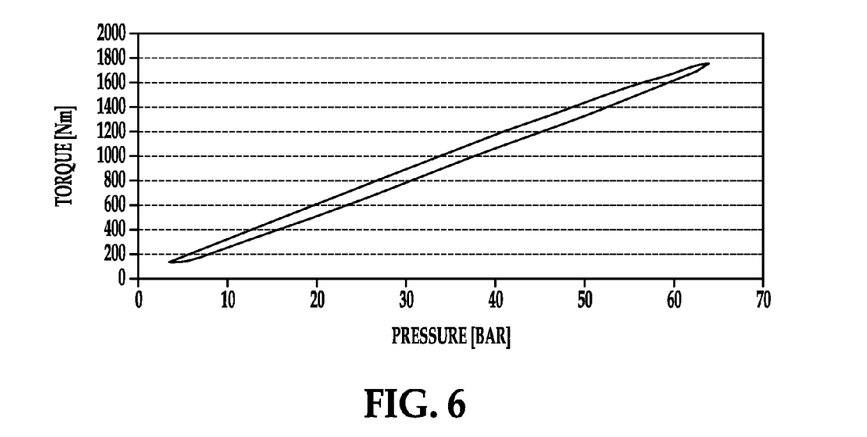
FIG. 6 is a line graph with wheel brake torque (Nm) as a function of the brake pressure (bar) during brake application.

The torque applied to wheel due to brake pressure build up can be approximated as a linear function of the brake pressure:

$$T_b = 2\mu_l r_{c2c} A_p P$$

Where $\mu_l$ is the lining friction coefficient that depends on the brake system component piece-to-piece variation, component wear and deterioration and ambient conditions (e.g. temperature, rain); $T_b$ is the brake torque generated from the brake pressure P; and $A_p$ is the total area of the brake pistons; $r_{c2c}$ is the distance from the center of brake caliper to the rotation center of the wheel. A line graph of the brake torque is plotted in FIG. 6, based on a real vehicle data.

Figure 7:
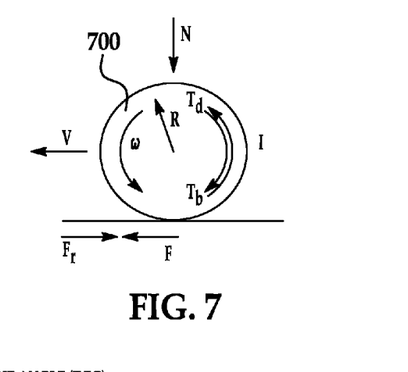
FIG. 7 is a diagrammatic view of a vehicle wheel, more particularly illustrating an exemplary wheel torque measurement technique for vehicle state estimation methods.
Figure 8:
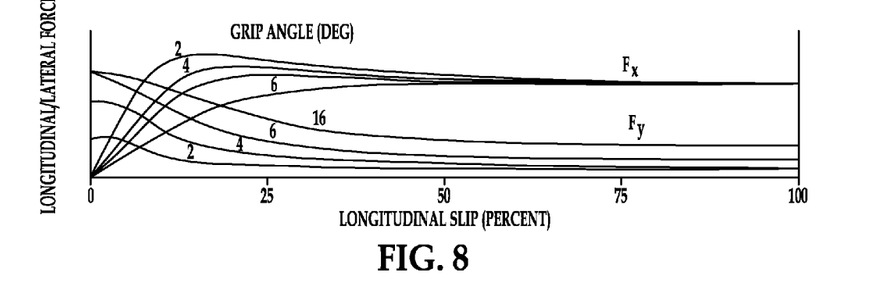
FIG. 8 is a line graph in which longitudinal slip (percent) is plotted vs. longitudinal and lateral force applied to a vehicle wheel.

Referring next to FIGS. 7 and 8, a vehicle wheel 700 illustrating that various torques and forces are applied to the wheel is shown in FIG. 7. In FIG. 8, the tire's longitudinal and lateral forces are plotted vs. the longitudinal slip ratio of the tire. Wheel torques in conjunction with the vehicle wheel 700 can be related to various motion variables of the wheel as are shown below:

Wheel Torque:

$$T_w = T_d - T_b$$

$$T_b = \kappa p = 2\mu_l r_{c2c} A_p p$$

Road Torque:

$$T_r = F_r R = NR\mu(\lambda) \text{ where } \lambda = 1 - \frac{\omega R}{v_x}$$

is the longitudinal slip ratio.

Wheel Dynamics:

$$I_w \dot{\omega} = T_w - T_r$$

Where $T_d$ is the driving torque; $T_b$ is the braking torque; $\mu_l$ is the lining friction coefficient; $r_{c2c}$ is the distance from the caliper to the wheel center; $F_r$ is the road force; $\mu(\lambda)$ is the friction coefficient as a function of slip ratio $\lambda$; N is the normal force; R is the wheel rolling radius; $v_x$ is the vehicle/wheel hub velocity; $I_w$ is the wheel rotational inertia. The tire force can be obtained from a tire model $T_r = NR_\mu(\lambda)$, as shown in FIG. 8 or obtained through estimation from the measured signals as in the following equation:

$$T_r = T_d - \kappa p - I_w \dot{\omega}$$

Now let's use the above single wheel dynamics to a whole car dynamics.

Let's consider a rear wheel drive HEV. Its longitudinal dynamics can be approximated by the following equations of motion:

$$M_t a_x = F_{x1} + F_{x2} + F_{x3} + F_{x4}$$

$$I_{wj}\dot{\omega}_i = T_{Ici} + T_{Emi} - T_{RBi} - T_{Fbi} - F_{xi} r_j$$

$$i \in \{1, 2, 3, 4\}, j \in \{f, r\}$$

where $M_t$ total mass of the vehicle, $a_x$ is the longitudinal acceleration of the vehicle defined at the center of gravity of the vehicle, $F_{xi}$ is the longitudinal tire force applied to the ith wheel from the ground, $T_{Ici}$ is the torques from the IC engine but transformed to the ith wheel, $T_{Emi}$ is the torque generated from the motor transformed to the ith wheel, $T_{Fbi}$ is the friction braking (due to brake pressure) at the ith wheel and $r_j$ is the rolling radius of the wheel at the jth axle.

During vehicle acceleration using only electric motor (E-mode), the above equations can be simplified to the following:

$$M_t a_x = F_{x3} + F_{x4}$$

$$I_{wr}\dot{\omega}_3 = T_{EM3} - F_{x3} r_r$$

$$I_{wr}\dot{\omega}_4 = = T_{EM4} - F_{x4} r_r$$

During vehicle acceleration with both IC engine and electric motor turned on, the above equations can be simplified as the following:

$$M_t a_x = F_{x3} + F_{x4}$$

$$I_{wr}\dot{\omega}_3 = T_{IC3} + T_{EM3} - F_{x3} r_r$$

$$I_{wr}\dot{\omega}_4 = T_{IC4} + T_{EM4} - F_{x4} r_r$$

During Compression Braking, the equation of motion can be derived as in the following:

$$M_t a_x = -|F_{x3}| - |F_{x4}|$$

$$I_{wr}\dot{\omega}_3 = -|T_{IC3}| + |Fx3| r_r$$

$$I_{wr}\dot{\omega}_4 = -|T_{IC4}| + |F_{x4}| r_r$$

During Regenerative Braking, the equation of motion can be derived as in the following:

$$M_t a_x = -|F_x 1| - |F_{x2}| - |F_{x3}| - |F_{x4}|$$

$$I_{wj}\dot{\omega}_1 = -|T_{FB1}| + |F_{x1}| r_f$$

$$I_{wj}\dot{\omega}_2 = -|T_{FB2}| + |F_{x2}| r_f$$

$$I_{wr}\dot{\omega}_3 = -|T_{RD3}| + |F_{x3}| r_f$$

$$I_{wr}\dot{\omega}4 = -|T_{RB4}| + |F_{x4}| r_f$$

During Friction Braking, the equation of motion can be derived in the following:

$$M_t a_x = -|F_x 1| - |F_{x2}| - |F_{x3}| - |F_{x4}|$$

$$I_{wj}\dot{\omega}_1 = -|T_{FB1}| + |F_{x1}| r_f$$

$$I_{wj}\dot{\omega}_2 = -|T_{FB2}| + |F_{x2}| r_f$$

$$I_{wf}\dot{\omega}_3 = -|T_{FB3}| - |R_{Rbmax3}| + |F_{x3}|r_r$$

$$I_{wf}\dot{\omega}_4 = -|T_{FB4}| - |R_{Rbmax4}| + |F_{x4}|r_r$$

Based on the above equation of motions considering different operation conditions of the involved actuations, various vehicle parameters and variables might be estimated based on the sensor measurements and the computed variables (states). One of the variables of interest is the estimation of the static offset in the longitudinal accelerometer. During E-mode acceleration, since the motor torque has an accurate measurement or computation, the off-set in the acceleration is likely to be detectable. Based on the aforementioned vehicle motions, this offset may be computed as follows:

$$\Delta a_x \approx \text{mean}\left\{ a_x - \frac{T_{EM} - I_{wr}(\dot{\omega}_3 + \dot{\omega}_4)}{r_r M_{t0}} \left(1 - \frac{\Delta M_t}{M_{t0}}\right) \text{ for certain conditions} \right\}$$

Where $\Delta a_x$ is the longitudinal acceleration offset, $a_x$ is the raw sensor measurement from the on-board acceleration sensor.

Another quantity of interest is the vehicle loading. Accurate vehicle loading info can be used to accurately determine the fuel consumption and SOC, shift scheduling, and vehicle controls, etc.

Vehicle loading estimation may be conducted as follows from aforementioned equations during E-mode acceleration (motor-only vehicle acceleration):

$$\Delta \hat{M}_t = \frac{\sum_k^N \left\{ \left[ \frac{T_{EMk}}{r_r} - \frac{I_{wr}}{r_r}(\dot{\omega}_{k3} + \dot{\omega}_{k4}) - M_{t0}a_{xck} \right] a_{xck} \right\}}{\sum_k^N a_{xck}^2}$$

$$\hat{M}_t = M_{t0} + \Delta \hat{M}_t$$

Another set of variables or quantities is related to how various braking mechanisms are delivering the brake actions, which is called brake effort estimation. This brake effort estimation can be used to populate the brake feel by the driver in the brake-by-wire set-up. Given a deceleration level, the driver brake feel or the brake effort at the brake pedal during RB can be estimated as follows.

During Regenerative Braking:

$$M_t a_{xc} = -|F_{x1}| - |F_{x2}| - |F_{x3}| - |F_{x4}|$$

$$I_{wf}\dot{\omega}_1 = -|T_{FB1}| + |F_{x1}|r_f; \quad I_{wf}\dot{\omega}_2 = -|T_{FB2}| + |F_{x2}|r_f$$

$$I_{wf}\dot{\omega}_3 = -|T_{RB3}| + |F_{x3}|r_r; \quad I_{wr}\dot{\omega}_4 = -|T_{RB4}| + |F_{x4}|r_r$$

Considering:

$$|T_{FB3}| = |T_{FB4}| = K_r P_{me}$$

The regenerative braking effort $T_{RBi}$ might be mimicked by the friction brake $T_{FBi}$ through a factitious brake pressure $P_{me}$:

$$|T_{RB3}| = |T_{RB4}| = K_r P_{me}$$

The fictitious or equivalent friction brake pressure during Regenerative Braking can now be calculated as $$P_{me} = \frac{-\hat{M}_t a_{xc} - \frac{I_{wf}}{r_f}(\dot{\omega}_1 + \dot{\omega}_2) - \frac{I_{wr}}{r_r}(\dot{\omega}_3 + \dot{\omega}_4)}{2k_f/r_f + 2k_r/r_r}$$

This variable can be fed into the brake force generator in a brake-by-wire system so as to generate brake feel that is equivalent to the brake pressure based friction brake feel.

The aforementioned equations together with different braking conditions can be used by a computer to estimate the balanced braking between regenerative braking at the rear axle and the friction braking at the front axle for a given driver braking demand–driver braking pressure p.

Given a pressure command, the balanced front friction braking (FFB) and rear regenerative braking (RRB) may be estimated based on the following equation of motion for braking the vehicle:

$$M_t a_{xc} = -|F_{x1}| - |F_{x2}| - |F_{x3}| - |F_{x4}|$$

$$I_{wf}\dot{\omega}_1 = -|T_{FB1}| + |F_{x1}|r_f;$$

$$I_{wf}\dot{\omega}_2 = -|T_{FB2}| + |F_{x2}|r_f$$

$$I_{wr}\dot{\omega}_3 = -|T_{RD3}| + |F_{x3}|r_f;$$

$$I_{wr}\dot{\omega}_4 = -|T_{RB4}| + |F_{x4}|r_f$$

First considering the case where vehicle is in stable condition, the driver braking is requesting brake pressure p, rear regenerative braking RRB is on, and the front friction braking FFB is off:

If $2(K_f + K_r)p < T_{RBbmax}$ $$|T_{RB}| = 2K_f p + 2K_r p;$$

else $$T_{RB} = T_{RBmax};$$

$$|T_{FB1}| = |T_{FB2}| = (K_f + K_r)p - T_{RBmax}/2;$$

Second, considering the case where vehicle is in stable condition, the driver braking is requesting brake pressure p, rear regenerative braking RRB is on, and the front friction braking is on:

if $|T_{RB}| = 2K_r p < T_{RBmax}$ $$|T_{RB}| = 2K_r p$$

else $$|T_{RB}| = T_{RBmax};$$

$$|T_{FB1}| = |T_{FB2}| = K_f p - 2k_r p - T_{RBmax}/2$$

During rear regenerative braking when the front friction braking has not kicked in, the RB (regenerative braking) torque might lead to undesired vehicle motion including stability event. In this case, as soon as the vehicle is moving towards its stability boundary (e.g., determined by ESC system), the rear brake torque from regenerative braking is reduced and part of it is redistributed to front friction braking. Such a control method is called Regenerative Braking Redistribution (RBR). While RBR might lead to certain loss of energy recovery, it does improve the vehicle stability and handling.

And the following logic can be used to redistribute the braking torques if vehicle is unstable if $|T_{yaw}| \le T_p$ and $T_p \le T_{RBmax}$ $$|T_{FBf0}| = |T_{yaw}|;$$

$$|T_{RB}| = 2(K_f + K_r)p - |T_{FBf0}|;$$

else if $|T_{yaw}| \leq T_p$ and $T_p > T_{RBmax}$ $|T_{FBf0}| = |T_{yaw}|$;

$T_{FB1} = T_{FB2} = \frac{1}{2}(T_p - T_{RBmax})$ additive with $|T_{FBf0}|$;

$|T_{RB}| = T_{RBmax}$;

else if $|T_{yaw}| > T_p$ and $T_p \leq T_{RBmax}$ $|T_{FBf0}| = |T_{yaw}|$;

$|T_{RB}| = T_p$;

else $|T_{FBf0}| = |T_{yaw}|$;

$T_{FB1} = T_{FB2} = \frac{1}{2}(T_p - T_{RBmax})$ additive with $|T_{FBf0}|$;

$|T_{RB}| = 0$;

In this way, the adversary motion of the vehicle due to rear regenerative braking is likely avoided and at the same the braking effort felt by the driver is similar.

The aforementioned equation of motions can be used to determine the lining friction coefficient insider the brake system. Such a friction coefficient is useful in achieving better braking performance.

During pure friction braking, we have the following relationship:

$$a_{xck} + \frac{I_{wf}}{r_f \hat{M}_t}(\dot{\omega}_{1k} + \dot{\omega}_{2k}) + \frac{I_{wr}}{r_r \hat{M}_t}(\dot{\omega}_{3k} + \dot{\omega}_{4k}) = \theta p_k$$

θ is a gain that can be estimated through least squares method:

$$\hat{\theta} = \frac{\Sigma_k^N \left\{ \left[ a_{xck} + \frac{I_{wf}}{r_f \hat{M}_t}(\dot{\omega}_{k3} + \dot{\omega}_{k4}) + \frac{I_{wr}}{r_r \hat{M}_t}(\dot{\omega}_{k3} + \dot{\omega}_{k4}) \right] p_k \right\}}{\Sigma_k^N p_k^2}$$

for certain conditions.
Considering the theoretic formula for $\Theta = 2/M_t(K_f/r_f + K_r/r_r)$ Considering $K_f = 2\mu_{rf} r_{cr2c} A_{rp}$, and assume $\mu_{rr} = \zeta \mu_{rf}$ Where ζ is a coefficient. The front lining friction coefficient is $\mu_{fl} = M_t \Theta/2(r_{cf2c} A_{fp}/r_f + r_{cr2c} A_{rp}/r_r \zeta)$ The rear lining coefficient is $\mu_{rr} = \zeta \mu_{fl}$.

Based on the above discussion, the general torque equation can be written as in the following:

$$a_{xck} + \frac{I_{wf}}{r_f \hat{M}_t}(\dot{\omega}_{1k} + \dot{\omega}_{2k}) + \frac{I_{wr}}{r_r \hat{M}_t}(\dot{\omega}_{3k} + \dot{\omega}_{4k}) = \theta_1 T_{dk} + \theta_2 p_k$$

Where $T_d$ is the total driving torque, $\Theta_1$ is the torque gain, $\Theta_2$ is the brake pressure gain; $\Theta_1$ and $\Theta_2$ can be estimated through least squares method during certain conditions. Since $\Theta_1$ and $\Theta_2$ are generally constant or very slow time varying, they can be determined in certain favorable computing conditions, but used for the other unfavorable computing conditions. With the identified $\Theta_1$ and $\Theta_2$, the acceleration $a_{xck}$ can be reconstructed based on the brake pressure and the driving torque. This reconstruction is very useful if the longitudinal accelerometer sensor has faults or if the longitudinal accelerometer is not available as a standard sensor.

Figure 9:
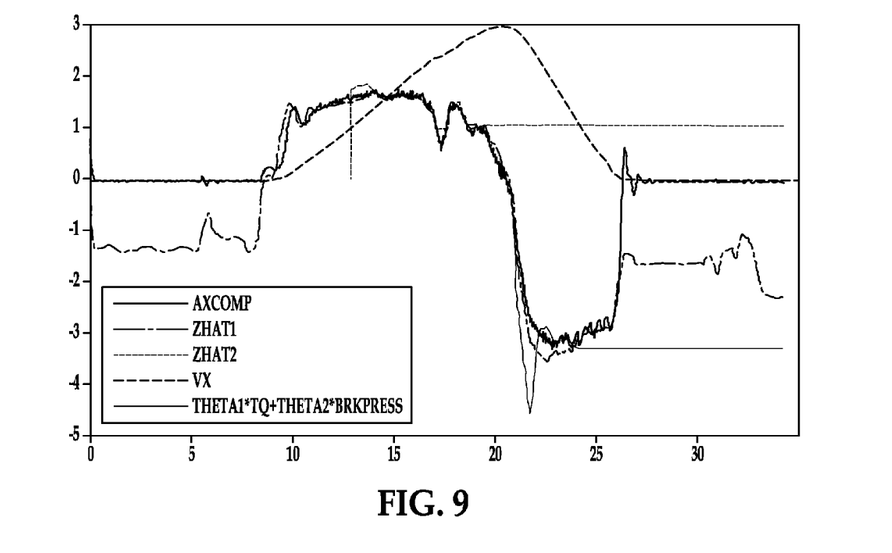
FIGS. 9 and 10 are acceleration reconstruction curves (IC engine data example) according to an illustrative vehicle state estimation method.
Figure 10:
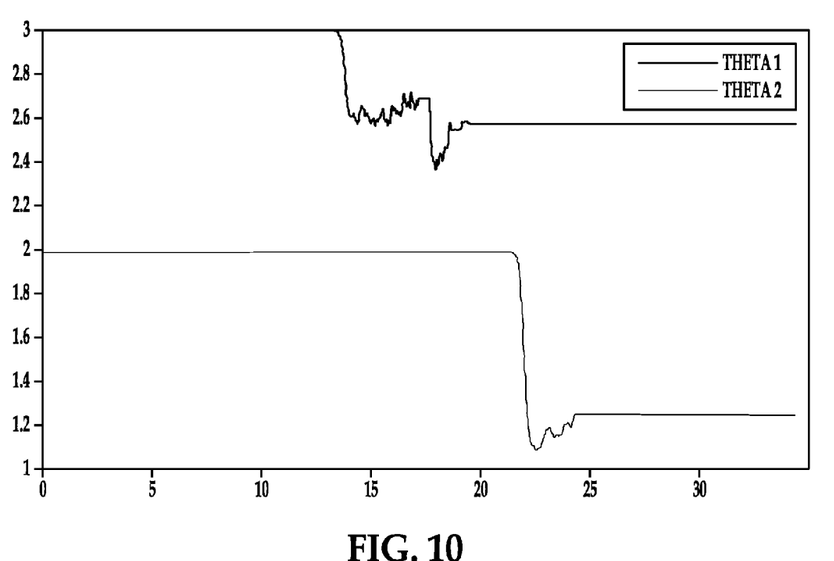

FIG. 9 illustrates that the longitudinal acceleration is reconstructed from the engine torque and the brake pressure-based brake torque. The real-time updates of $\Theta_1$ (torque gain) and $\Theta_2$ (brake pressure gain) are shown in FIG. 10.

Figure 11:
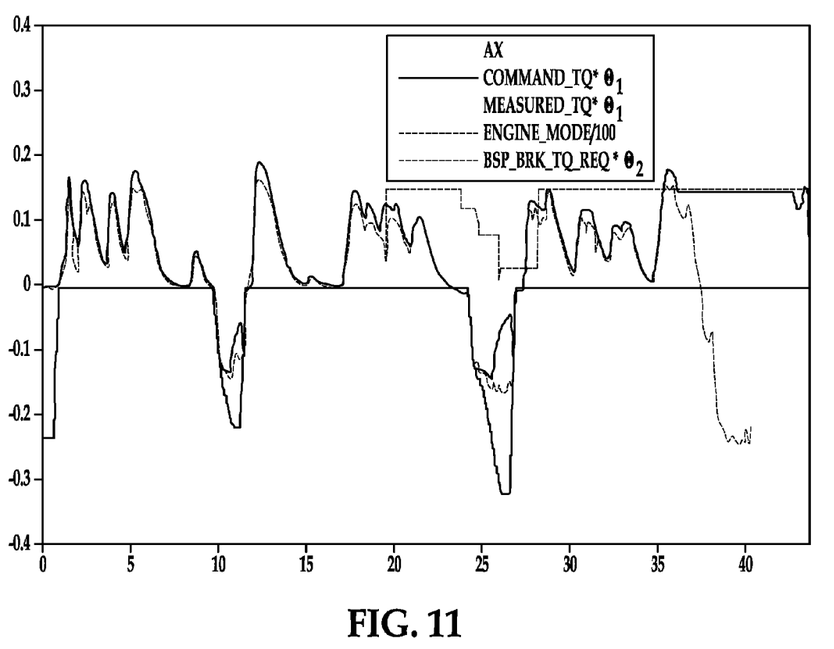
FIG. 11 is an acceleration reconstruction curve (HEV data example) according to an illustrative vehicle state estimation method.

FIG. 11 is an acceleration reconstruction curve (HEV data example) according to the aforementioned longitudinal acceleration reconstruction method.

Figure 12:
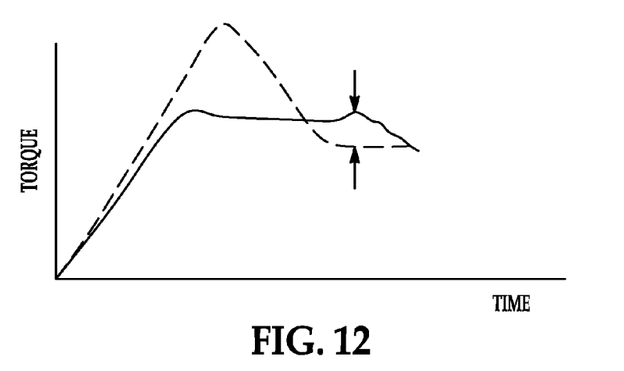
FIG. 12 is a line graph in which wheel torque is plotted as a function of time and illustrating enhanced wheel slip control according to an illustrative vehicle state estimation method.
Figure 13:
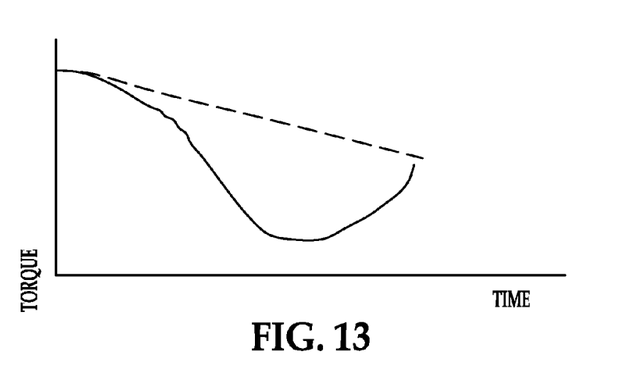
FIG. 13 is a line graph in which wheel velocity is plotted as a function of time and illustrating enhanced wheel slip control according to an illustrative vehicle state estimation method.

FIG. 12 is a line graph in which wheel torque is plotted as a function of time and illustrating enhanced wheel slip control. FIG. 13 is a line graph in which wheel velocity is plotted as a function of time and illustrates enhanced wheel slip control according to an illustrative vehicle state estimation method.

Due to the accurate estimation of the linear and nonlinear active wheel torque, the road torque and force torque (RT/F) can be accurately estimated. This road force and torque can be used to determine the peak values. Hence, the slip control can place the tire torque and force in a much smaller area around the peak values in either events for anti-lock braking system (ABS) or traction control system (TCS) event or traction event.

Figure 14:
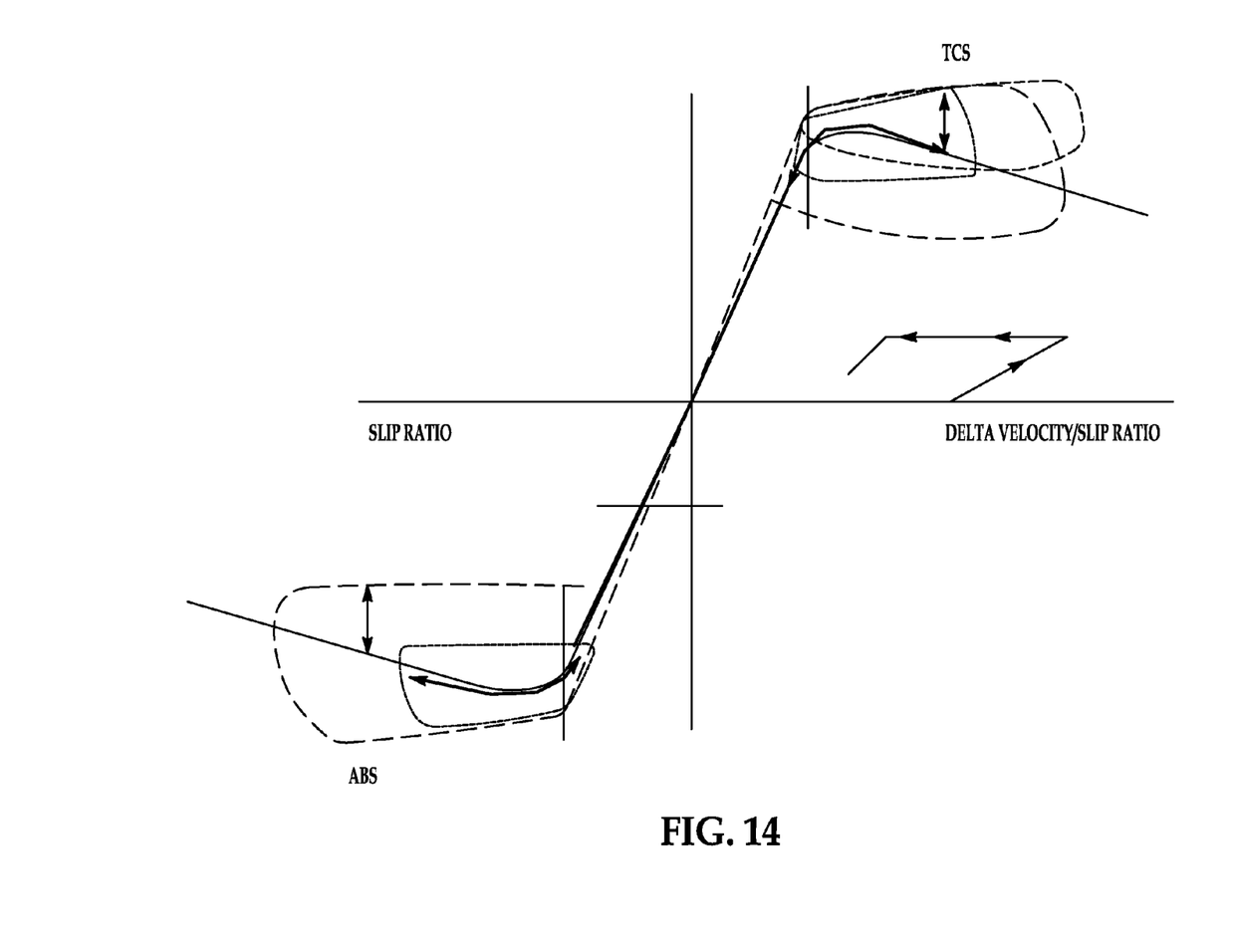
FIG. 14 is a line graph in which illustrates enhanced wheel slip control according to an illustrative vehicle state estimation method.
Figure 15:
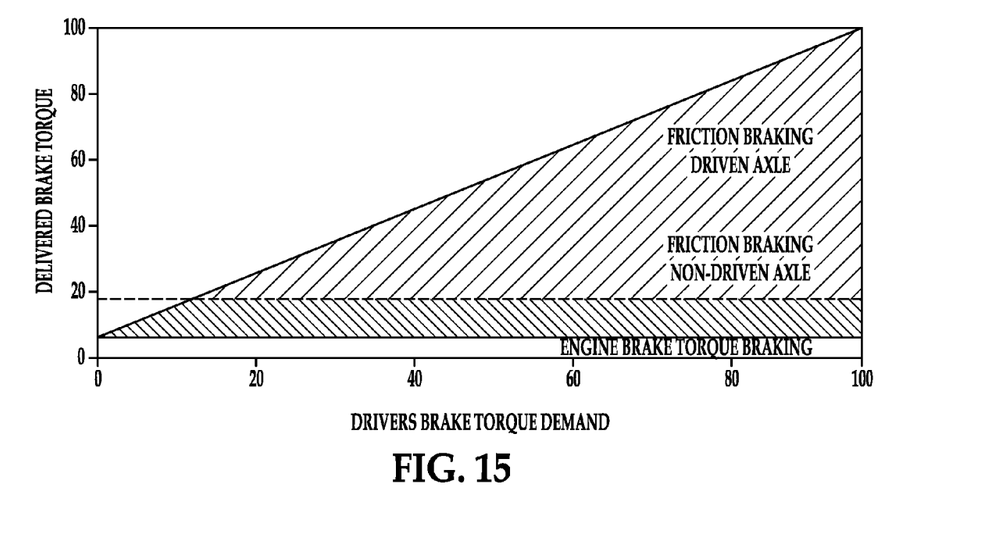
FIG. 15 is a line graph in which delivered brake torque is plotted as sum of the friction brake (through brake pressure buildup) and regenerative brake through electric motor.

FIG. 15 is a line graph in which regenerative braking is conducted during linear tire force range showed in FIG. 14. The delivered brake torque is plotted as a function of drivers brake torque demand.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A hybrid vehicle control method, comprising:
    providing a processor executing programmed instructions stored in non-transitory memory to determine vehicle states, the determining vehicle states comprising:
    determining a measured torque at a torque actuator location on the vehicle including an electric drive motor, the torque sensed by a torque sensor at the torque actuator location;
    using the measured torque to estimate a road torque/force of at least one wheel of the vehicle, the road torque/force comprising at least one of torque and force applied to the at least one wheel from a ground surface in contact with the at least one wheel;
    using the road torque/force to determined at least one vehicle state estimation; and,
    using the processor or another processor to control at least regenerative brake application of the vehicle using the at least one vehicle state estimation the measured torque comprises engine torque in a hybrid mode of the hybrid vehicle.

2. The method of claim 1 further comprising using the measured torque to estimate an active wheel torque, the active wheel torque comprising torque transferred from a torque actuator location to at least one wheel of the vehicle.

3. The method of claim 2 wherein the active wheel torque comprises linear active wheel torque.

4. The method of claim 2 wherein the active wheel torque comprises nonlinear active wheel torque.

5. The method of claim 1 wherein the measured torque comprises automatic transmission torque.

6. The method of claim 1 wherein the measured torque comprises axle torque.

7. The method of claim 1 further comprising measuring a brake pressure applied at the at least one wheel and computing a brake torque applied at the at least one wheel from the measured brake pressure.

8. A vehicle state estimation method, comprising:
providing a processor executing programmed instructions stored in non-transitory memory by to determine vehicle states, the determining vehicle states comprising:
determining a measured torque at a torque actuator location on the vehicle including an electric drive motor, the torque sensed by a torque sensor at the torque actuator location;
using the measured torque to estimate an active wheel torque, the active wheel torque comprising torque transferred from the torque actuator location to at least one wheel of the vehicle;
using the active wheel torque to estimate a road torque/force of at least one wheel of the vehicle, the road torque/force comprising at least one of torque and force applied to the at least one wheel from a ground surface in contact with the at least one wheel;
using the road torque/force to determined at least one vehicle state estimation,
the at least one vehicle state estimation including at least one of the following:
longitudinal accelerometer offset compensation estimation,
vehicle loading estimation,
brake effort estimation,
brake balancing estimation,
regenerative brake redistribution estimation,
brake lining friction coefficient estimation,
acceleration reconstruction estimation, and
enhanced wheel slip control estimation; and
using the processor or another processor to apply the at least one vehicle state estimation to control at least regenerative brake application of the vehicle.

9. The method of claim 8 wherein the measured torque comprises automatic transmission torque.

10. The method of claim 8 wherein the measured motor torque comprises engine torque in hybrid mode of a hybrid vehicle.

11. The method of claim 8 wherein the measured torque comprises axle torque.

12. The method of claim 8 further comprising using the measured torque to estimate an active wheel torque, the active wheel torque comprising torque transferred from a torque actuator location to at least one wheel of the vehicle.

13. The method of claim 12 wherein the active wheel torque comprises linear active wheel torque.

14. The method of claim 8 further comprising measuring a brake pressure applied at the at least one wheel and computing a brake torque applied at the at least one wheel from the measured brake pressure.

15. The method of claim 8 wherein the longitudinal accelerometer offset compensation estimation comprises using motor actuation torque during motor-only vehicle acceleration to compute a longitudinal accelerometer offset, the longitudinal accelerometer offset used to to generate a compensated longitudinal acceleration.

16. The method of claim 8 wherein the at least one vehicle state estimation comprises the vehicle loading estimation which further comprises using a motor actuation torque during motor-only vehicle acceleration to compute loading changes of the vehicle over a previously determined value.

17. The method of claim 8 wherein the at least one vehicle state estimation comprises the brake effort estimation which further comprises converting the regenerative braking effort into an equivalent friction brake pressure effort for the regenerative braking event.

18. The method of claim 8 wherein the at least one vehicle state estimation comprises the brake balancing estimation which further comprises balancing a braking effort between regenerative braking and friction braking for a given drive braking request.

19. The method of claim 8 wherein the at least one vehicle state estimation comprises the regenerative brake redistribution estimation which further comprises taking away a portion of a regenerative braking effort from the at least one wheel comprising rear wheels of the vehicle and generating braking effort equivalent friction braking at front wheels of the vehicle such that a total braking effort stays about the same.

20. The method of claim 8 wherein the at least one vehicle state estimation comprises the brake lining friction coefficient estimation which further comprises using brake pressure based brake torque for the at least one wheel to compute a brake lining friction coefficient for a brake associated with the at least one wheel.

21. The method of claim 8 wherein the at least one vehicle state estimation comprises acceleration reconstruction estimation which further comprises an acceleration estimation of the vehicle without using a sensed longitudinal accelerometer value.

22. The method of claim 8 wherein the at least one vehicle state estimation comprises enhanced wheel slip control which further comprises using linear and nonlinear portions of the active wheel torque to estimate the road torque/force, the road torque/force used to determine a tire force for slip control.

23. A vehicle state estimation method, comprising:
providing a processor executing programmed instructions stored in non-transitory memory by to determine vehicle states, the determining vehicle states comprising:
obtaining a measured torque in response to sensing a torque at a torque actuator location including an electric drive motor and determining at least one of the following: actuation torque, braking torque, automatic transmission torque, engine torque and wheel torque;
using the measured torque to formulate a vehicle state estimation for vehicle control, the vehicle state estimation including at least one of the following:
longitudinal accelerometer offset compensation estimation,
vehicle loading estimation, brake effort estimation,
brake balancing estimation,
regenerative brake redistribution estimation,
brake lining friction coefficient estimation,
acceleration reconstruction estimation and
enhanced wheel slip control estimation; and
using the processor or another processor to apply the vehicle state estimation to control at least regenerative brake application of the vehicle.

24. The method of claim 23 wherein the measured torque is used to compute linear active wheel torque.

25. The method of claim 23 wherein the measured torque is used to compute nonlinear active wheel torque.

26. The method of claim 23 wherein determining actuation torque comprises measuring engine torque in hybrid mode of a hybrid vehicle.

27. The method of claim 23 wherein the at least one vehicle state estimation comprises longitudinal accelerometer offset compensation estimation which further comprises using motor actuation torque during motor-only vehicle acceleration to compute a longitudinal accelerometer offset, the longitudinal accelerometer offset used to to generate a compensated longitudinal acceleration.

28. The method of claim 23 wherein the at least one vehicle state estimation comprises vehicle loading estimation which further comprises using a motor actuation torque during motor-only vehicle acceleration to compute loading changes of the vehicle over a previously determined value.

29. The method of claim 23 wherein the at least one vehicle state estimation comprises the brake effort estimation which further comprises converting the regenerative braking effort into an equivalent friction brake pressure effort for the regenerative braking event.

30. The method of claim 23 wherein the at least one vehicle state estimation comprises the brake balancing estimation which further comprises balancing a braking effort between regenerative braking and friction braking for a given drive braking request.

31. The method of claim 23 wherein the at least one vehicle state estimation comprises the regenerative brake redistribution estimation which further comprises taking away a portion of a regenerative braking effort from rear wheels of the vehicle and generating braking effort equivalent friction braking at front wheels of the vehicle such that a total braking effort stays about the same.

32. The method of claim 23 wherein the at least one vehicle state estimation comprises the brake lining friction coefficient estimation which further comprises using brake pressure based brake torque for at least one wheel to compute a brake lining friction coefficient for a brake associated with the at least one wheel.

33. The method of claim 23 wherein the at least one vehicle state estimation comprises the acceleration reconstruction estimation which further comprises an acceleration estimation of the vehicle without using a sensed longitudinal accelerometer value.

34. The method of claim 8 wherein the at least one vehicle state estimation comprises the enhanced wheel slip control which further comprises using linear and nonlinear portions of the active wheel torque to estimate the road torque/force, the road torque/force used to determine a tire force for slip control.

35. The method of claim 1 wherein the at least one vehicle state estimation comprises at least one of the following:
longitudinal accelerometer offset compensation estimation,
vehicle loading estimation,
brake effort estimation,
brake balancing estimation,
regenerative brake redistribution estimation,
brake lining friction coefficient estimation,
acceleration reconstruction estimation, and
enhanced wheel slip control estimation.

* * * * *